(12) United States Patent
Chen et al.

(10) Patent No.: US 7,333,491 B2
(45) Date of Patent: Feb. 19, 2008

(54) METHOD AND APPARATUS FOR PACKET FORWARDING IN A SWITCH CONTROLLER

(75) Inventors: Jin-Ru Chen, TaiChung (TW); Chun-Feng Liu, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 973 days.

(21) Appl. No.: 10/425,969

(22) Filed: Apr. 30, 2003

(65) Prior Publication Data

US 2003/0202513 A1   Oct. 30, 2003

(30) Foreign Application Priority Data

Apr. 30, 2002  (TW) .............................. 91108903 A (51) Int. Cl.
H04L 12/28  (2006.01)
H04L 12/56  (2006.01)

(52) U.S. Cl. ..................... 370/392; 370/401

(58) Field of Classification Search ............... 370/349, 370/352, 355, 432, 389, 390, 392, 393, 475, 370/400, 401–404
See application file for complete search history.

(56) References Cited

U.S. PATENT DOCUMENTS 6,331,983 B1* 12/2001 Haggerty et al. ........... 370/400
6,457,059 B1* 9/2002 Kobayashi ................. 709/242
6,553,028 B1* 4/2003 Tang et al. ................. 370/389
6,839,348 B2* 1/2005 Tang et al. ................. 370/390
2003/0165140 A1* 9/2003 Tang et al. ................. 370/393

FOREIGN PATENT DOCUMENTS

JP   2000-332752   11/2000

* cited by examiner

Primary Examiner—Chau Nguyen
Assistant Examiner—Hicham B Foud
(74) Attorney, Agent, or Firm—Troxell Law Office, PLLC (57) ABSTRACT

The present invention provides a method and apparatus for packet forwarding within a switch controller. In addition to unicast and broadcast forwarding, the method and apparatus can also analyze and forward IP multicast packets without the need of a CPU and a separate multicast address table, thereby enabling IP multicasting for the switch controller. Wherein, specific packet parsing and updating rules are used to analyze IP multicast control packets, and a multicast router or an address table is updated based on the analyzing result. IP multicast packets is then forwarded according to the updated tables. Moreover, with an extra flag bit set in each address table entry, unicast and multicast forwarding can share the same address table.

20 Claims, 7 Drawing Sheets

METHOD AND APPARATUS FOR PACKET FORWARDING IN A SWITCH CONTROLLER

BACKGROUND OF THE INVENTION (a). Field of the Invention

The present invention relates in general to packet forwarding in a switch controller, and more particularly to a method and apparatus which enables a switch controller to analyze and forward IP multicast packets.

(b). Description of the Prior Arts

The data unit transceived on the Internet is typically referred to as an IP packet. IP packets are divided into three types based on their destination IP addresses: broadcast packets, multicast packets and unicast packets. A unicast packet comprises an IP unicast address, which specifies a single destination, for transmitting the packet thereto from a source. Each computer on the Internet has at least an IP unicast address. A broadcast packet comprises an IP broadcast address used to send the packet from a source to all other nodes on the same local area network (LAN). A multicast packet comprises an IP multicast address used to send the packet from a source to a multiplicity of specific destinations, which can be combined as a group. Thus, the multicast address is also called a group address.

Figure 1:
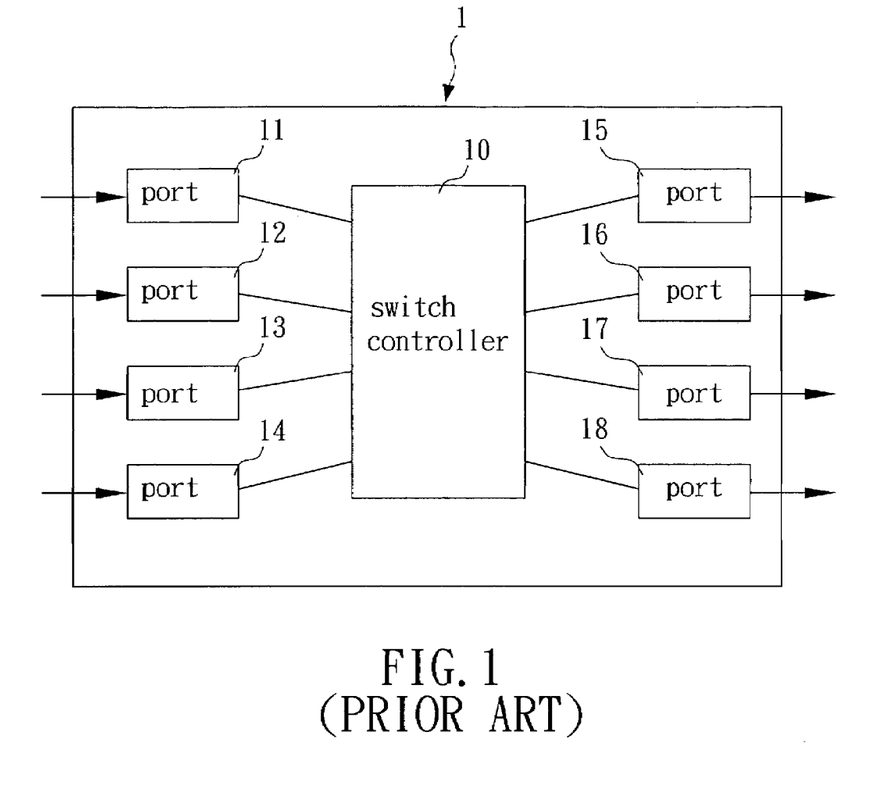
FIG. 1 is a block diagram of a conventional switch.

A switch may be used to forward IP packets during the packet routing process. FIG. 1 shows a block diagram of a conventional switch. FIG. 1 illustrates an example of packet forwarding in a switch 1. The switch 1 has a number of ports which connect to other network devices by physical transmission lines, such as twisted pair wiring, optical fibers, etc. The switch 1 comprises a switch controller 10 and eight ports 11-18. If a packet is received in the port 11 and forwarded to the port 15 via the controller 10, then this way of packet forwarding is unicasting (i.e. one-to-one). If a packet is received in the port 12 and broadcasted to all the ports via the controller 10, it is broadcasting (i.e. one-to-all). If a packet is received in the port 13 and forwarded to the port 15 and 16 via the controller 10, it is multicasting (i.e. selectively outputted to a specific plurality of ports).

Typically, when a switch determines how to forward a packet, it would look up a forwarding/address table, which records correspondence between MAC addresses and switch ports, to configure a port map for the packet (i.e. the port(s) which the packet is destined to), no matter which way of forwarding is concerned.

As for IP multicasting, there are two kinds of IP multicast packets, i.e. IP multicast control packets and IP multicast data packets. A switch handles these two kinds of packets in different ways. IP multicast control packets are differentiated according to the message type: router protocol packets (IGMP Query packets and multicast routing protocol packets) and group member protocol packets (IGMP Report and Leave packets). Router protocol packets, where a protocol such as IGMP, PIM, DVMRP or CBT is used, are broadcasted to all switch ports, while group member protocol packets are sent directly to router ports (i.e. ports connecting to multicast routers). An IP multicast data packet, on the other hand, involves multicast address table lookup and forwarding operations. If the table lookup returns a hit, the data packet is forwarded to all group member ports and router ports. If the multicast address is not stored in the address table (i.e. lookup miss), then the packet is broadcasted to all ports.

When a host wants to receive IP multicast traffic for a specific IP multicast address, it generates an IGMP Report packet to register its membership for the desired multicast address. A switch could learn the IP multicast group membership by monitoring IGMP Report packets. In addition to the IGMP Report message, IGMP version 2 also introduces a new type of IGMP message, the Leave message, to let the last group member cancel the multicast address registration on a multicast router faster. Multicast routers keep and refresh the membership information by generating IGMP Query packets to the All-hosts-group (IP multicast address=224.0.0.1) periodically. The switch could learn the location of multicast routers by recording the port numbers that have IGMP Query packets passed. In addition to IGMP Query packets, when the switch receives a multicast routing protocol packet, such as a PIM/DVMRP/CBT packet, the router ports can be identified as well.

Figure 3:
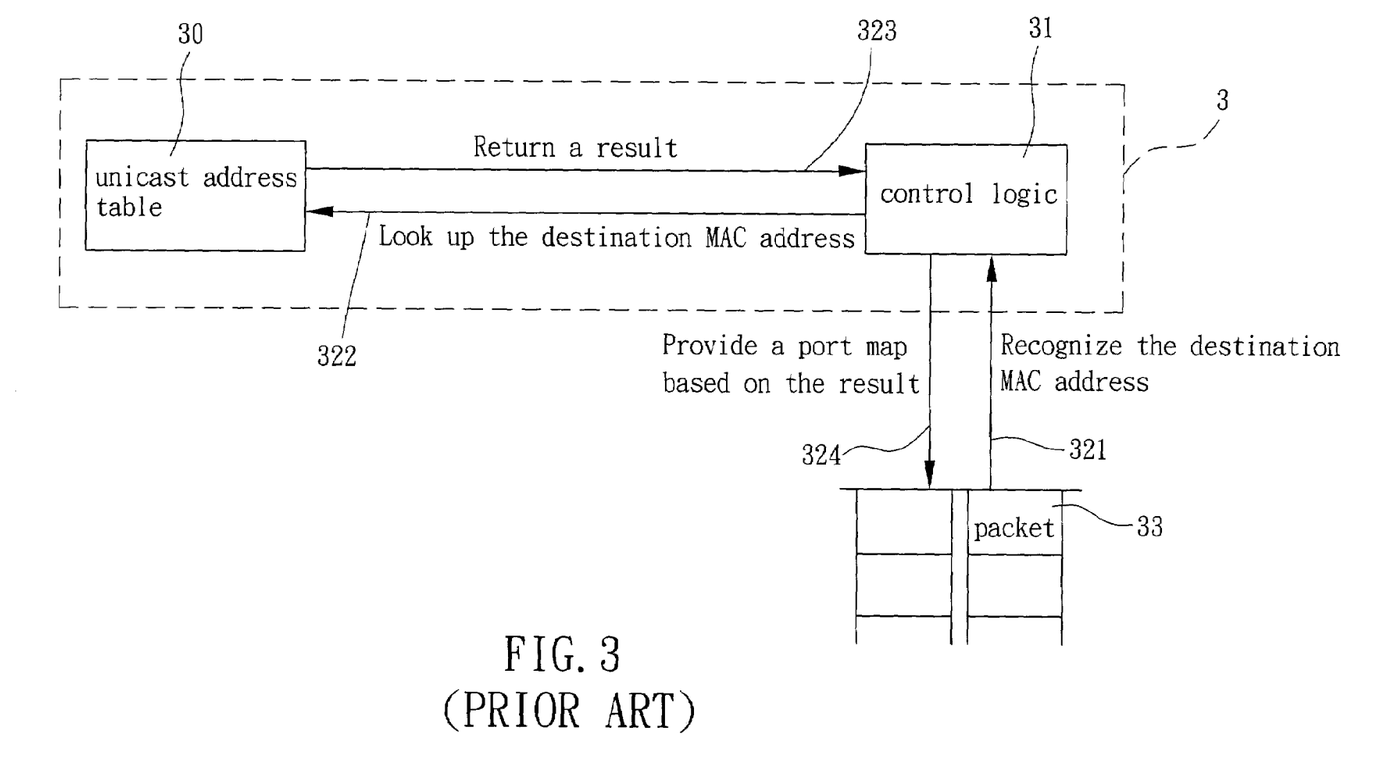
FIG. 3 is a diagram showing how a dumb switch forwards a packet.

However, not each conventional switch has IP multicast capability. In the prior art, a switch controller combined with a CPU is used to process IP multicast packets. But a switch without a CPU, also called dumb switch, can only perform unicasting and broadcasting, not multicasting. FIG. 3 is a diagram showing how a dumb switch forwards a packet. As shown in FIG. 3, the steps are:

321 a control logic 31 recognizing the destination MAC address of a received packet 33;

322 the control logic 31 looking up the destination MAC address in a unicast address table 30;

323 the unicast address table 30 returning a lookup result; and 324 the control logic 31 provide a port map for the packet 33 based on the lookup result.

In the above steps, the conventional switch controller 3 compares the destination MAC address of the received packet 33 with a number of MAC unicast addresses stored in the unicast address table 30. If a hit is returned, then the packet 33 is a unicast packet and would be forwarded to the destination address; if a miss is returned, then the packet 33 is not a unicast packet and would be broadcasted to all ports of the switch controller 3. That is, the switch controller 3 cannot analyze multicast packets, and is only able to deal with unicast and broadcast packets. Therefore, a conventional switch controller needs the help of a CPU to process multicast packets.

Figure 2:
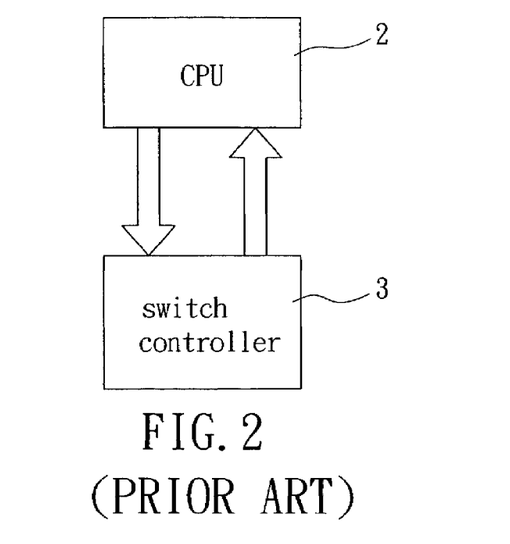
FIG. 2 is a diagram showing that a switch controller handles IP multicast packets with the help of a CPU.

Please refer to FIG. 2. As shown in FIG. 2, the conventional switch controller 3 provides IP multicast control packets to the CPU 2, then the CPU 2 parses the provided control protocol packets and configures multicast forwarding rules based on the parsing result. The switch controller 3 then forwards IP multicast data packets according to the configured rules. However, the design o f a switch controller combined with a CPU makes the whole system very complicated and would cost much higher. For example, an interface between the switch controller and the CPU must be added to achieve this design.

SUMMARY OF THE INVENTION

In view of this, the present invention provides a method and apparatus for analyzing and forwarding IP multicast packets within a switch controller and without the need of a CPU and a separate multicast address table, thereby simplifying the complexity of circuit design, lowering the associated cost and meanwhile upgrading network performance.

Accordingly, in attainment of the aforementioned object, it is a feature of the present invention to provide a method for packet forwarding implemented by a switch controller comprising an address table and a multicast router table. The method comprises steps of:

(a) checking if a destination MAC address of a received packet hits in the address table and then configuring a port map;

(b) determining whether the received packet is an IP packet, and jumping to step (f) if the packet is not the IP packet;

(c) checking a type of the packet, wherein if the packet is a router protocol packet then proceeding to step (d), if the packet is a group member protocol packet then jumping to step (e), and if the packet is any other type packet then jumping to step (f);

(d) updating the multicast router table, configuring the port map as all ports of the switch controller and jumping to step (f);

(e) determining whether a destination IP address of the packet lies in a specific scope of IP multicast addresses, and updating the address table and configuring the port map as all router ports of the switch controller if the destination IP address does not lie in the specific scope; and (f) forwarding the packet according to the port map.

In another aspect, it is a feature of the present invention to provide an apparatus for packet forwarding used in a switch controller. The apparatus comprises: a multicast router table, storing information associated with switch ports connecting to multicast routers; an address table, recording correspondence between MAC addresses and switch ports; and a control logic, configuring a port map for a received packet based on an address table lookup and a type of the packet, selectively updating the multicast router table or the address table based on the type of the packet, and forwarding the packet according to the port map.

DETAILED DESCRIPTION OF THE PRESENT INVENTION

This section will provide a detailed description with preferred embodiments and appended drawings to make the object and features of the present invention more apparent and easy to understand.

Figure 4:
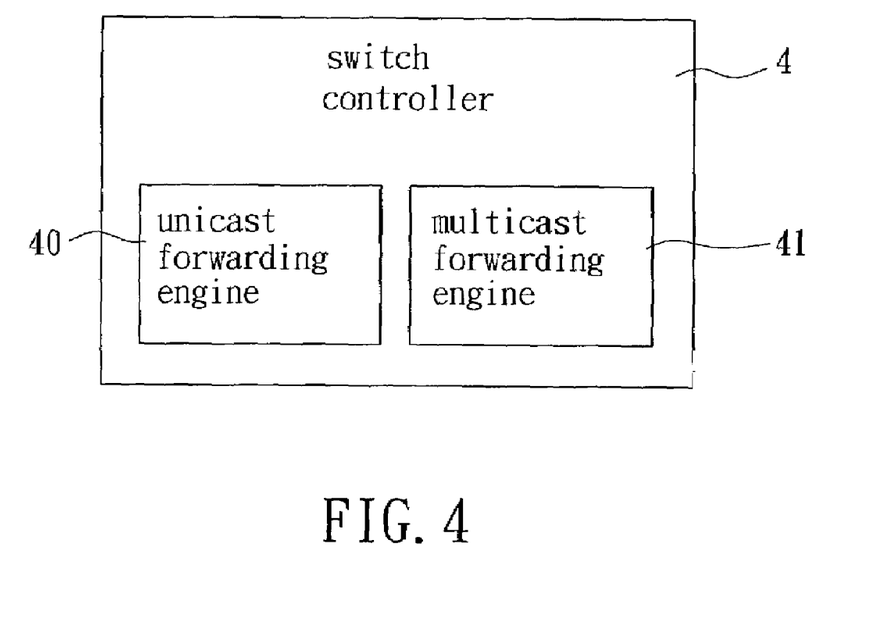
FIG. 4 is a diagram showing a switch controller integrating unicast and multicast forwarding according to the present invention.

FIG. 4 is a diagram showing a switch controller integrating unicast and multicast forwarding according to the present invention. As shown in FIG. 4, the switch controller 4 comprises a unicast forwarding engine 40 for forwarding unicast packets, and a multicast forwarding engine 41 for forwarding multicast packets, recognizing types of multicast control packets and learning router ports and group member ports, wherein the port learning can maintain the updated group membership and help the switch controller to configure a port map for each received multicast packet.

Figure 5:
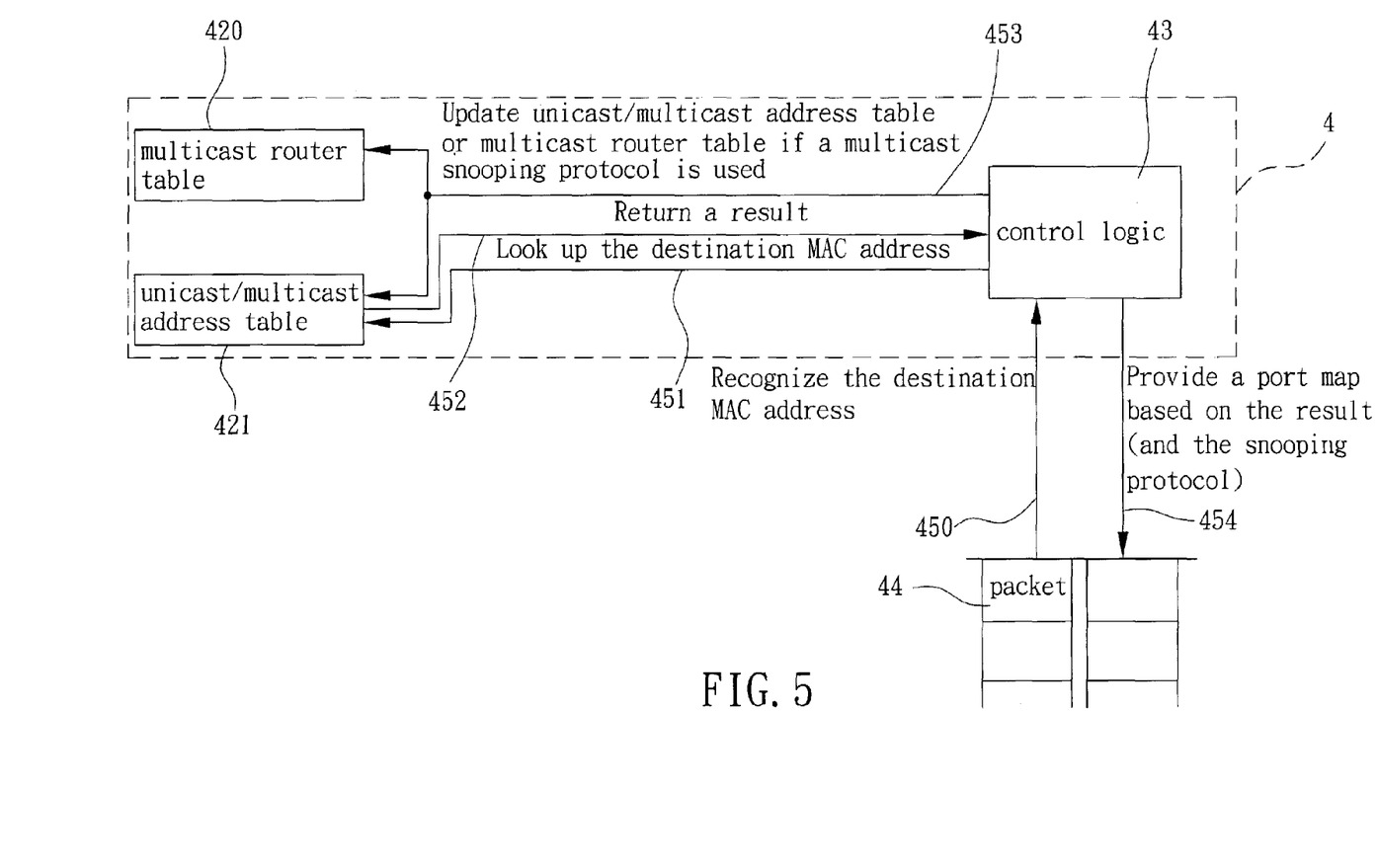
FIG. 5 is a diagram illustrating a flow of processing received packets using the switch controller 4 according to the present invention.

FIG. 5 is a diagram illustrating a flow of processing received packets using the switch controller 4 according to the present invention. As shown in FIG. 5, a packet 44 is provided to a control logic 43 of the switch controller 4. The control logic 43 then checks if a destination MAC address of the packet 44 accords with any address stored in a unicast/multicast address table 421. The checking result is then sent back to the control logic 43 for subsequent processing. The flow comprises steps of:

450 the control logic 43 recognizing the destination MAC address of the received packet 44;

451 the control logic 43 looking up the destination MAC address in the unicast/multicast address table 421;

452 the unicast/multicast address table 421 returning a lookup result to the control logic 43;

453 the control logic 43 updating the unicast/multicast address table 421 or a multicast router table 420 if an IP multicast snooping protocol is used in the packet 44; and b 454 the control logic 43 providing a port map for forwarding the packet 44 based on the lookup result (and the multicast snooping protocol).

In the step 453, the IP multicast snooping protocol is referred to any protocol used in IP multicast control packets, such as IGMP, PIM, DVMRP or CBT, and it can be "snooped" by the switch controller 4 to obtain the required information for table updating.

It is notable that the flow in FIG. 5 can be used for both unicasting and multicasting. The unicast/multicast address table 421 of the switch controller 4 stores a multiplicity of MAC unicast addresses and MAC multicast addresses, each of which corresponds to certain switch port(s). If the returned lookup result in the step 452 indicates a hit for a unicast/multicast address, then the packet 44 is a unicast/multicast packet, and in the step 454 the control logic 43 configures a port map based on correspondence between the unicast/multicast address and switch port(s) as stored in the address table 421.

Figure 6:
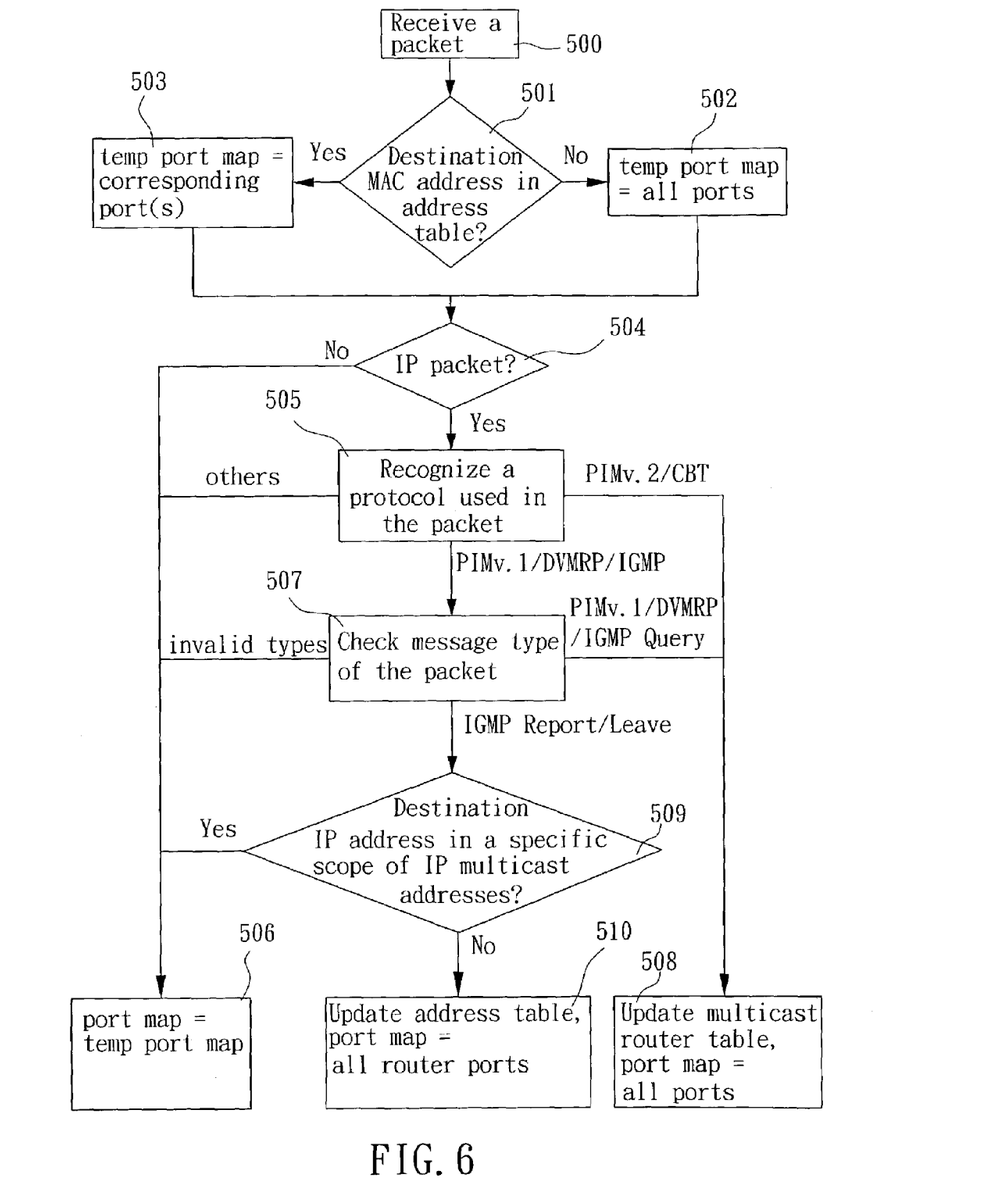
FIG. 6 is a diagram illustrating a preferred embodiment of the method for packet forwarding according to the present invention.

Based on the flow in FIG. 5, a detailed flow is provided in FIG. 6 to illustrate a preferred embodiment of the method for packet forwarding used in a switch controller according to the present invention. As shown in FIG. 6, the detailed flow comprises steps of:

500 receiving a packet;

501 checking if a destination MAC address of the received packet is in an address table;

502 configuring a temporary port map as all ports of the switch controller if the destination MAC address is not in the address table;

503 configuring the temporary port map as the corresponding port(s) if the destination MAC address is in the address table;

504 determining if the packet is an IP packet, if yes/no then jumping to step 505/506;

505 recognizing a protocol used in the packet, wherein if the protocol is not an IP multicast snooping protocol then proceeding to step 506; if the protocol is CBT or PIM (version 2) then jumping to step 508; and if the protocol is IGMP, DVMRP or PIM (version 1) then jumping to step 507;

506 configuring a port map for forwarding the packet as the temporary port map, and ending the flow;

507 checking a message type of the packet, wherein if the message type shows that the packet is a PIM v.1/DVMRP/IGMP query packet, then proceeding to step 508; if the packet is an IGMP Report/Leave packet, then jumping to step 509; and if the packet is of an invalid type, then jumping to step 506;

508 updating a multicast router table, configuring the port map as the all ports, and ending the flow;

509 determining if the destination IP address of the packet lies in a specific scope of IP multicast addresses, if yes/no then jumping to step 506/510; and 510 updating the address table, configuring the port map as all router ports, and ending the flow.

After configuring the port map in the step 506/508/510, the switch controller forwards the packet according to the port map. In addition, the address table mentioned above can be the unicast/multicast address table 421 in FIG. 5, and the specific scope of IP multicast addresses in the step 509 comprises 224.0.0.0 to 224.0.0.255 since these addresses are reserved for routing protocols and should not be learned into the address table.

The flow in FIG. 6 proceeds with reference to specific packet parsing and updating rules, as shown in Table 1. The IP Protocol column of Table 1 corresponds to the Protocol field in an IP packet, while the Message Type ID column corresponds to the Type field in an IGMP/DVMRP/PIM v.1 packet. Based on the previous two columns, the Update Table column indicates the table which needs updating and the Update Parameter column shows associated parameters used in table updating, wherein the incoming port No. is the number of the port receiving the packet, and the group IP address (GIP) is the IP multicast address associated with the IGMP Report/Leave packet. Specifically speaking, in the steps 505 and 507 of FIG. 6, the Protocol and Type fields of the received packet are examined respectively to determine if one or none of the address table and the multicast router table needs updating.

TABLE 1

Packet parsing and updating rules.

| IP Protocol | Message Type ID | Update Table | Update Parameter |
|---|---|---|---|
| 0x2 | 0x11 IGMP Query | Multicast router table | <Incoming port No.> |
| 0x2 | 0x13 DVMRP | Multicast router table | <Incoming port No.> |
| 0x2 | 0x14 PIM v.1 | Multicast router table | <Incoming port No.> |
| 0x67 PIM v.2 | — | Multicast router table | <Incoming port No.> |
| 0x7 CBT | — | Multicast router table | <Incoming port No.> |
| 0x2 | 0x12 IGMP v.1 Report 0x16 IGMP v.2 Report | Address table | <GIP, incoming port No., Version No.> |
| 0x2 | 0x17 IGMP Leave | Address table | <GIP, incoming port No.> |
| 0x2 | All others | No operation | None |
| All others | Don't care | No operation | None |

Since each IP multicast address maps to a unique Ethernet multicast address prefixed as 01-00-5e, it is sufficient to record the Ethernet multicast address rather than the IP multicast address, and it is possible for the multicast address table to share the original unicast address table with an extra flag bit set in the table entry.

Figure 7:
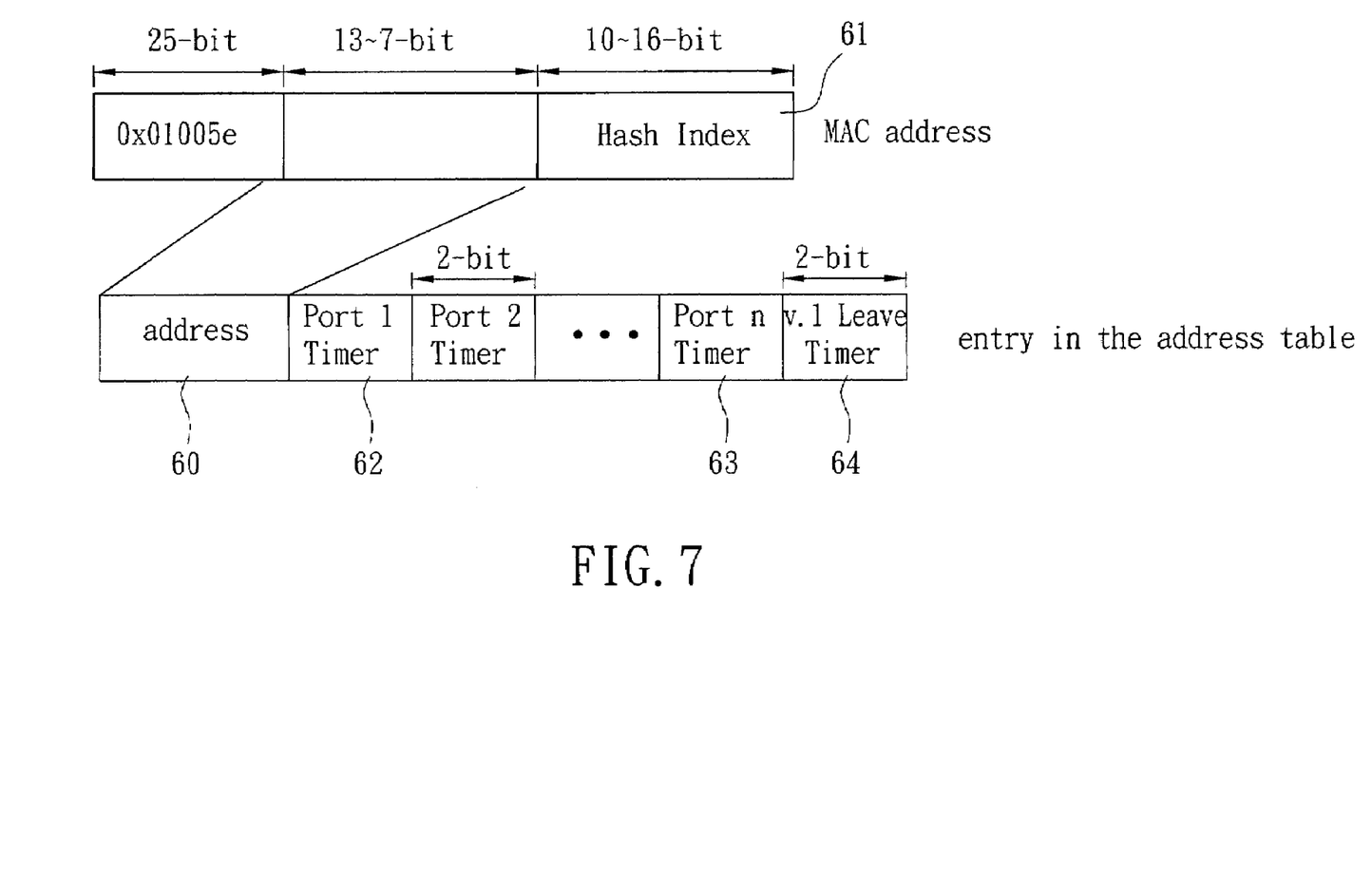
FIG. 7 is a diagram of an address table entry format according to the present invention.

FIG. 7 is a diagram of an address table entry format according to the present invention. In FIG. 7 (the extra flag bit not shown), the length of the address field 60 is variable, depending on the number of bits used for hash index 61. The table entry also includes a 2-bit wide port timer field 62-63 for each port, and a 2-bit wide v.1 Leave timer field 64. For example, if a switch has 24 ports and 12 bits are used for hashing, the length of each table entry is 11+2×24+2=61 bits. Each port timer field 62-63 is used to represent the group membership of the corresponding port. If the value of the port timer is non-zero, the corresponding port is a member of the multicast address recorded in the address field 60. When an IGMP Report packet is received on a specific port, its port timer is set to 3 (general timeout). If on the other hand an IGMP Leave packet is received, the port timer is set to 1 (fast timeout). The value of each port timer is reduced by the general timeout mechanism of the switch, and when the value becomes zero, it means that the corresponding port is no longer the member of the multicast address. The v.1 Leave timer field 64 is used to indicate whether or not IGMP v.2 Leave messages should be ignored. RFC 2236 specifies that IGMP v.2 Leave messages should be ignored if there are IGMP v.1 group members in the same multicast group. The v.1 Leave timer field 64 is set to 3 if the switch receives an IGMP v.1 Report message on any port. The value is reduced every time general timeout scan reaches the port receiving the IGMP v.1 Report message.

The multicast router table contains only timers for each port. Each time an IGMP Query packet is received on a specific port, the corresponding timer of the specific port is reset to an initial value 3. The value is reduced every time general timeout scan reaches the specific port, and when the value becomes zero, the specific port is no longer considered as a router port.

Figure 8:
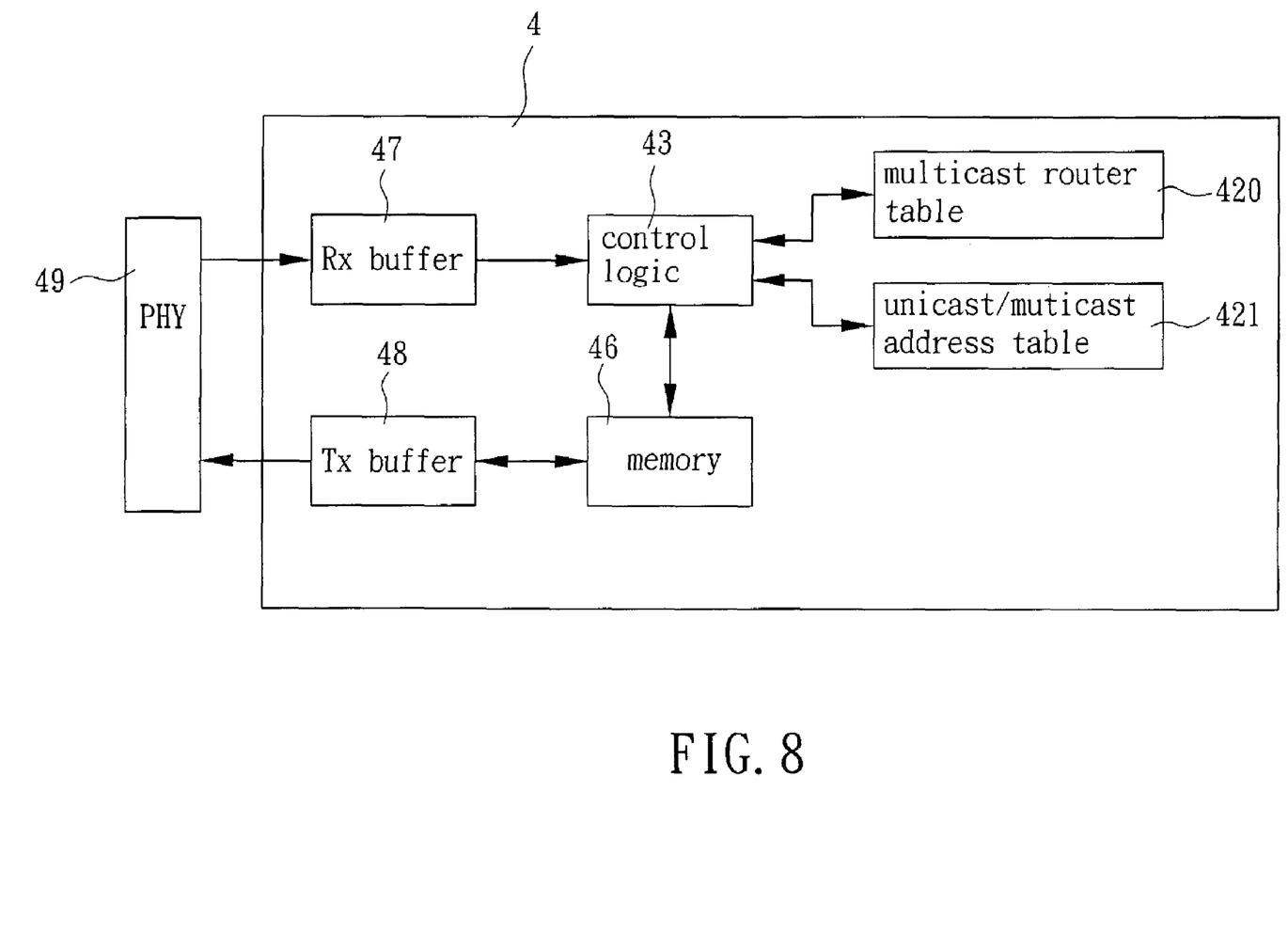
FIG. 8 is a block diagram showing a preferred embodiment of a switch controller according to the present invention.

FIG. 8 is a block diagram showing a preferred embodiment of a switch controller according to the present invention. As shown in FIG. 8, the switch controller 4 at least comprises the control logic 43, the unicast/multicast address table 421, the multicast router table 420, a memory 46, an Rx packet buffer 47 and a Tx packet buffer 48. The Rx packet buffer 47 stores packets inputted via a PHY device 49, while the Tx packet buffer 48 stores the packets processed by the control logic 43 for outputting via the PHY device 49. The memory 46 provides storage space for the control logic 43 during the processing of the inputted packets. The multicast router table 420 stores information associated with switch ports connecting to multicast routers, while the unicast/multicast address table records correspondence between MAC unicast/multicast addresses and switch ports. The control logic 43 configures a port map for each inputted packet based on an address table lookup and a type of the inputted packet, selectively updates the multicast router table 420 or the address table 421 based on the type of the inputted packet, and forwards the inputted packet according to the port map via the PHY device 49.

It is notable that the apparatus for packet forwarding of the present invention comprises the control logic 43, the unicast/multicast address table 421 and the multicast router table 420. Please refer to FIG. 5 and FIG. 6 for the related control flows of the apparatus.

While the present invention has been shown and described with reference to preferred embodiments thereof, and in terms of the illustrative drawings, it should be not considered as limited thereby. Various possible modification, omission, and alterations could be conceived of by one skilled in the art to the form and the content of any particular embodiment, without departing from the scope and the spirit of the present invention.

What is claimed is:

1. A method for packet forwarding implemented by a switch controller comprising an address table and a multicast router table, comprising steps of:
configuring a port map according to a destination Media Access Control (MAC) address of a received packet and the address table;
updating the multicast router table and configuring the port map as all ports of the switch controller if the received packet is an Internet Protocol (IP) packet and a protocol used in the received packet is one of Core Base Trees (CBT) and Protocol Independent Multicast Version (PIM v2);
updating the multicast router table and configuring the port map as the all ports if the received packet is an IP packet and a message of the received packet is selected from a group consisting of an Internet Group Management Protocol (IGMP) Query message, a Distance Vector Multicast Routing Protocol (DVMRP) message, and a PIM v1message;
updating the address table and configuring the port map as all router ports of the switch controller if the received packet is an IP packet and the message of the received packet is one of an IGMP Report message and an IGMP Leave message and a destination IP address of the received packet does not lie in a specific scope of IP multicast addresses; and
forwarding the received packet according to the port map,
wherein each entry of the address table comprises an address field corresponding to a first MAC address and a port timer field for each of the all ports to record a valid time for corresnondence between the each port and the first MAC address.

2. The method as recited in claim 1, wherein the switch controller configures the port map as a corresponding port if the destination MAC address hits in the address table and configures the port map as the all ports if the destination map address misses in the address table.

3. The method as recited in claim 1, wherein the specific scope comprises 224.0.0.0 to 224.0.0.255.

4. The method as recited in claim 1, wherein the address field stores a specific portion of the first MAC address.

5. The method as recited in claim 1, wherein the valid time of a certain port is set to a general timeout value if an IGMP Report packet destined to the first MAC address is received on the certain port and set to a fast timeout value if an IGMP Leave packet destined to the first MAC address is received on the certain port.

6. The method as recited in claim 1, wherein the valid time is decreased periodically, and the switch controller stops forwarding a packet destined to the first MAC address to a certain port when the valid time of the certain port returns to zero.

7. The method as recited in claim 1, wherein each entry of the address table further comprises a v.1 Leave timer field for indicating whether an IGMP v.2 Leave packet destined to the first MAC address should be ignored.

8. The method as recited in claim 7, wherein the v.1 Leave timer field is set to an initial value if an IGMP v.1 Report packet destined to the first MAC address is received on any port of the switch controller, and the initial value is added by a first value periodically, wherein the IGMP v.2 Leave packet is ignored if the v.1 Leave timer field does not reach to a first threshold.

9. The method as recited in claim 1, wherein each entry of the address table further comprises a flag bit for indicating that the first MAC address is either a unicast address or a multicast address.

10. A method for packet forwarding implemented by a switch controller comprising an address table and a multicast router table, comprising steps of:
configuring a port map according to a destination Media Access Control (MAC) address of a received packet and the address table;
updating the multicast router table and configuring the port map as all ports of the switch controller when the packet is a router protocol packet;
updating the address table and configuring the port map as all router ports of the switch controller when the packet is a group member protocol packet and a destination Internet Protocol (IP) address of the packet does not lie in a specific scope of IP multicast addresses; and
forwarding the packet according to the port map,
wherein each entry of the address table comprises an address field corresponding to a first MAC address and a port timer field for each of the all ports to record a valid time for correspondence between the each port and the first MAC address.

11. The method as recited in claim 10, wherein the switch controller configures the port map as a corresponding port when the destination MAC address hits in the address table and configures the port man as the all ports when the destination MAC address misses in the address table.

12. The method as recited in claim 10, wherein the router protocol packet is selected from a group consisting of a Protocol Independent Multicast (PIM) packet, a Distance Vector Multicast Routing Protocol (DVMRP) packet, a Core Based Trees (CBT) packet, and an Internet Group Management Protocol (IGMP) query packet.

13. The method as recited in claim 10, wherein the group member protocol packet is one of an IGMP Report packet and an IGMP Leave packet.

14. An apparatus for packet forwarding used in a switch controller, comprising:
a multicast router table, storing information associated with switch ports connecting to multicast routers;
an address table, recording correspondence between Media Access Control (MAC) addresses and switch ports; and
a control logic, configuring a port map for a received packet based on an address table lookup and a type of the received packet, selectively updating the multicast router table or the address table based on the type of the received packet, and forwarding the received packet according to the port map,
wherein each entry of the address table comprises an address field corresponding to a first MAC address and a port timer field for each of the all ports to record a valid time for correspondence between the each port and the first MAC address.

15. The apparatus as recited in claim 14, wherein the control logic configures the port map as a corresponding port of the switch controller when a destination MAC address of the received packet hits in the address table and configures the port map as all ports of the switch controller when a destination MAC address of the received packet misses in the address table.

16. The apparatus as recited in claim 14, wherein the control logic updates the multicast router table and configures the port map as all ports of the switch controller when the packet is a router protocol packet.

17. The apparatus as recited in claim 14, wherein the control logic updates the address table and configures the port map as all router ports of the switch controller when the packet is a group member protocol packet and a destination IP address of the packet does not lie in a specific scope of IP multicast addresses.

18. The apparatus as recited in claim 14, wherein the address field stores a specific portion of the first MAC address.

19. The apparatus as recited in claim 14, wherein the control logic decreases the valid time periodically and stops forwarding a packet destined to the first MAC address to a certain port when the valid time of the certain port returns to zero.

20. The apparatus as recited in claim 14, wherein each entry of the address table further comprises a flag bit for indicating the first MAC address is either a unicast address or a multicast address.

* * * * *